United States Patent [19]
Shih

[11] Patent Number: 5,519,963
[45] Date of Patent: May 28, 1996

[54] ELECTRONIC INSECT-KILLING SWATTER

[76] Inventor: Tsao-i Shih, 2nd Fl., No. 3, Alley 3, Lane 283, Tehsing E. Rd., Taipei, Taiwan

[21] Appl. No.: 446,941

[22] Filed: May 18, 1995

[51] Int. Cl.⁶ .............................. A01M 3/02; A01M 5/02
[52] U.S. Cl. ................................. 43/137; 43/112
[58] Field of Search ...................... 43/137, 112

[56] References Cited

U.S. PATENT DOCUMENTS

| | | | |
|---|---|---|---|
| 2,881,554 | 4/1959 | Laine | 43/137 |
| 2,951,310 | 9/1960 | Anderson et al. | 43/112 |
| 3,473,251 | 10/1969 | Kahn | 43/112 |
| 3,673,730 | 7/1972 | Hegenberger | 43/137 |
| 3,789,537 | 2/1974 | Rule et al. | 43/112 |
| 4,300,306 | 11/1981 | Hudgin | 43/112 |

Primary Examiner—Jack W. Lavinder
Assistant Examiner—Allyson Abrams
Attorney, Agent, or Firm—Poms, Smith, Lande & Rose

[57] ABSTRACT

An electronic insect-killing swatter includes a handle and a support frame composed of a first insulation screen and a second insulation screen coincided with each other each having a plurality of bars, a first set of electrodes sandwiched by the bars of the insulation screens, and a second set of electrodes isolated from each other and secured between the insulation screens in a staggered relation to the first set of electrodes, a high voltage generating means having an output connected to the first set and the second set of electrodes for providing a voltage of sufficiently high to the electrodes for killing insects.

1 Claim, 4 Drawing Sheets

ELECTRONIC INSECT-KILLING SWATTER

BACKGROUND OF THE INVENTION

This invention relates to an electronic insect killing device, particularly to an electronic insect killing swatter.

A conventional fly swatter for insect killing causes a lot of trouble because the user has to be skillful enough to hit the insect before it flies away. Also, the dead body of the insect becomes messy and thus contaminates the environment. In an outdoor environment, mosquitoes usually fly around and are not easily killed by a conventional fly swatter.

SUMMARY OF THE INVENTION

It is an object of the present invention to provide an electronic insect-killing swatter having a plurality of grids sized large enough to have an insect to marginally pass through but too small to allow a child's finger to pass through and receive an electric shock.

It is another object of the present invention to provide an electronic insect-killing swatter which is able to kill an insect without disintegrating the insect and causing mess.

It is yet another object of the present invention to provide an electronic insect-killing swatter which is powered by battery cells without additionally connecting to an AC power source.

It is one aspect to provide an electronic insect-killing swatter for killing insects comprising a handle and a frame coupled to the handle. The frame is composed of a first insulation screen and a second insulation screen coincided with each other, each having a plurality of bars defining a plurality of grids for insects to marginally pass through. A first set of electrodes is sandwiched by the bars of the first and the second insulation screens and has a width no less than that of the bars of the insulation screens. A second set of electrodes is secured between the first and the second insulation screens with a staggered relation to the first set of electrodes so that both sets of the electrodes are isolated from each other. A high voltage generating means is provided within the handle with an output connected to the first set of electrode and the second set of electrode for generating a voltage sufficiently high to kill insects. Therefore, the insects passed through the grids will be in contact with both sets of electrodes simultaneously and killed.

These and additional objects, if not set forth specifically herein, will be readily apparent to those skilled in the art from the detailed description provided herein, with appropriate reference to the accompanying drawings.

DETAILED DESCRIPTION OF THE PREFERRED EMBODIMENT

Figure 1:
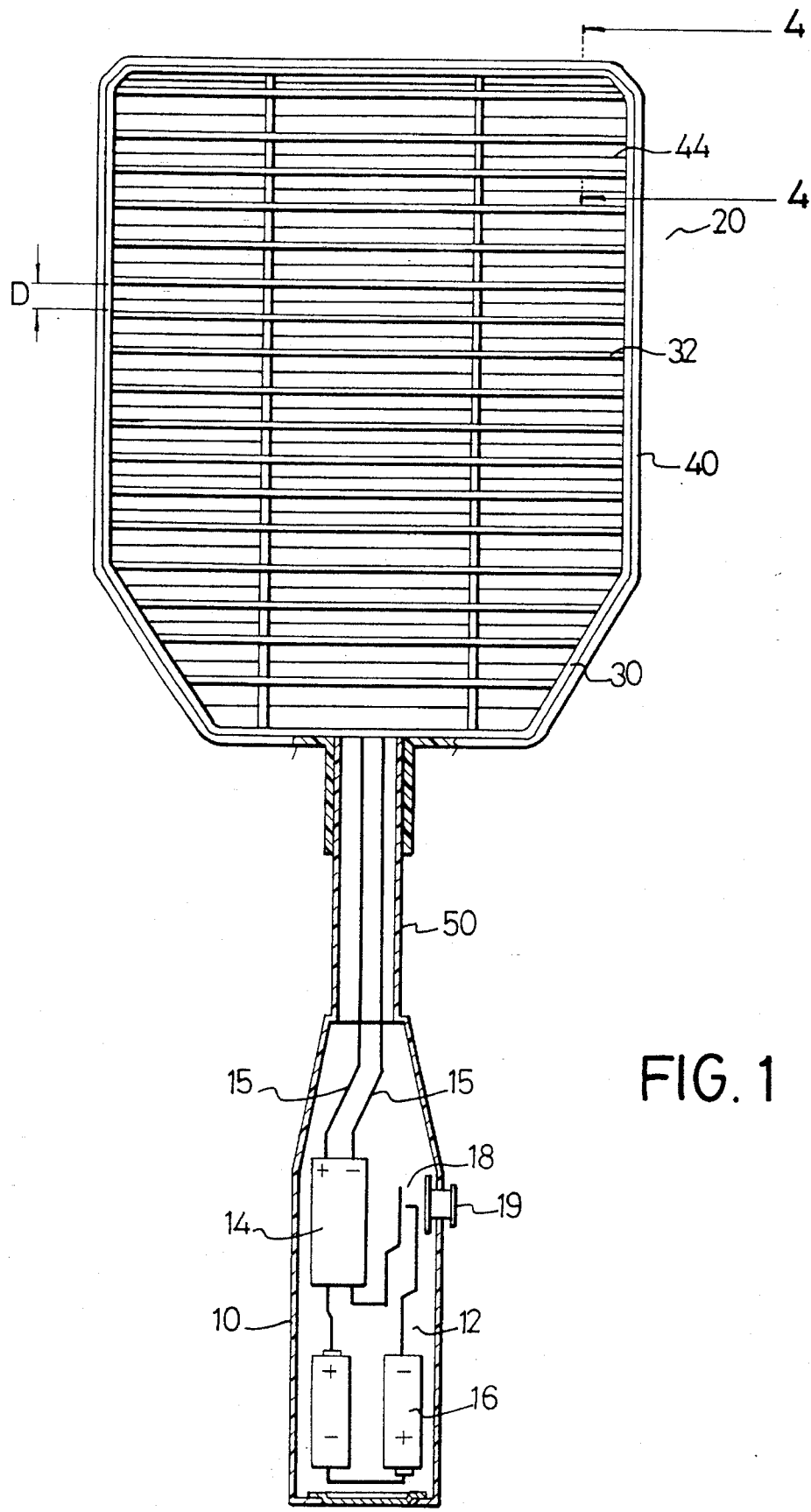
FIG. 1 is a schematic view, partially cut-away, of an electronic insect-killing swatter, showing an internal arrangement of a handle, in accordance with the present invention.

Referring to FIG. 1, an electronic insect-killing swatter in accordance with the present invention comprises a handle 10, a support frame 20, and a tube 50 connected between the handle 10 and the support frame 20. The handle 10 has a chamber 12 for receiving a high voltage generating circuit 14, a plurality of battery cells 16, and an ON/OFF switch 18.

The support frame 20 is composed of a first insulation screen 30 and a second insulation screen 40 coinciding with each other. The insulation screens 30, 40 respectively have a plurality of grids 32, 42 (not shown) composed of a plurality of vertical bars and a plurality of horizontal bars with gaps D, preferable 5 mm, for an insect such as a fly to marginally pass through. A first set of electrodes 34 (shown in FIG. 4) is sandwiched between the horizontal bars of the insulation screens 30, 40 while a second set of electrodes 44 is secured in a staggered relation to the horizontal bars of the first and the second insulation screens 30, 40.

Figure 2:
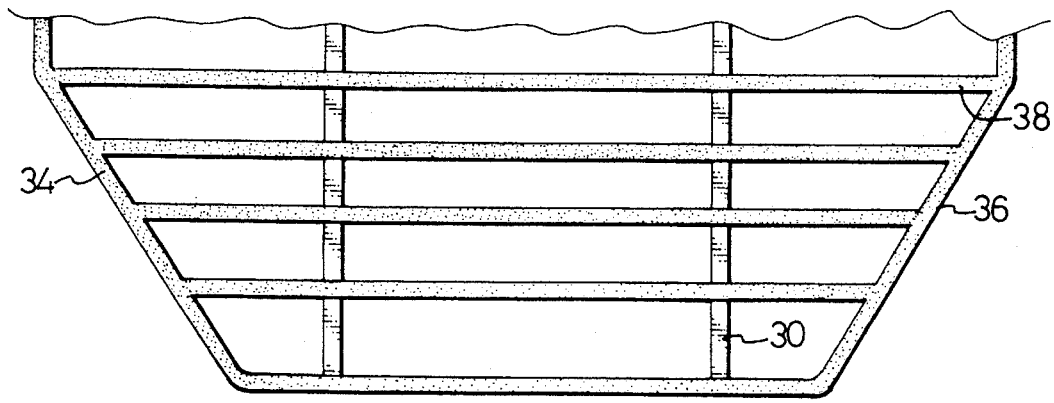
FIG. 2 is an elevational view partially showing a first insulation screen in accordance with the present invention.

As shown in FIG. 2, an elevational view of the first insulation screen 30 covered with the first set of electrodes 34 is shown. The first set of electrodes 34 is composed of a peripheral electrode 36 attached to a periphery of the first insulation screen 30 and a plurality of longitudinal electrodes 38 (shown in FIG. 4) attached to the horizontal bars of the first insulation screen 30. The width of the longitudinal electrodes 38 is not less than the width of the horizontal bars of the first insulation screen 30, a difference G of 0.5 mm is preferable.

Figure 3:
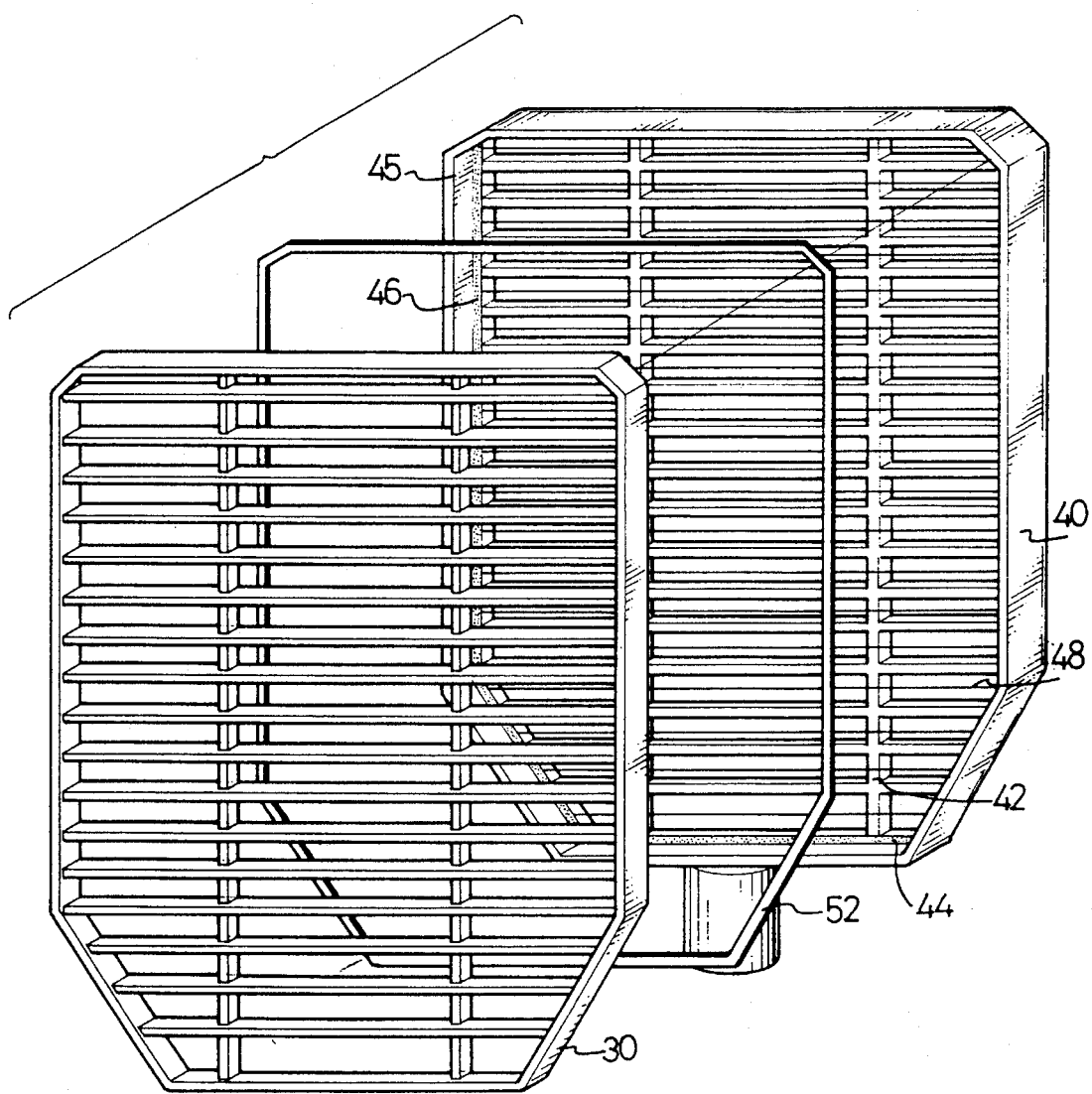
FIG. 3 is a perspective exploded view of a support frame in accordance with the present invention.

FIG. 3 shows an exploded view of the support frame 20. The second insulation screen 40 has a protruding edge 45 for engaging with the first insulation screen 30 and a plurality of grids 42 having an identical structure to grids 32 for coinciding with the grids 32. The grids 42 are composed of a plurality of vertical bars and a plurality of horizontal bars. The second set of electrodes 44 is composed of a peripheral electrode 46 attached to a periphery of the second insulation screen 40 which faces the first insulation screen and a plurality of longitudinal electrodes 48 staggered relative to the horizontal bars of the second insulation screen 40. The longitudinal electrodes 48 are preferably conductive wires with a fine diameter such as 51 mils.

When the first insulation screen 30 is received by the second insulation screen 40, an isolation strip 52 is placed between the peripheral electrodes 36 (shown in FIG. 2), 46 of the first set and the second set of electrodes 30, 40 for protecting the electrodes from short circuit.

Figure 4:
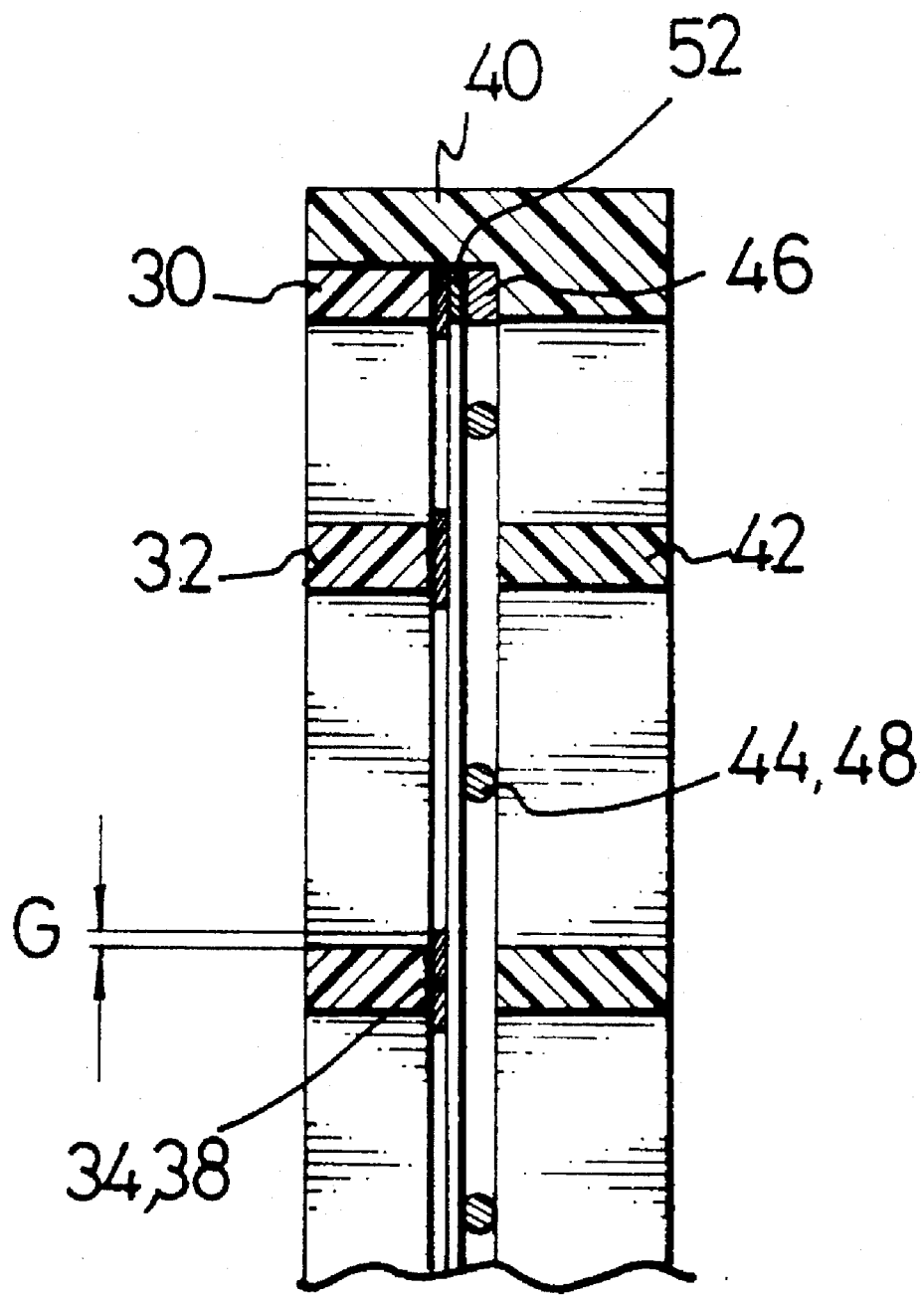
FIG. 4 is an enlarged cross-sectional view of support frame taken along line 4—4 of FIG. 1.

Referring FIG. 4, as the first set of electrodes 34 is sandwiched by the grids of the first insulation screen 30 and the second insulation screen 40, the chance for a child to simultaneously contact the longitudinal electrodes 38, 48 of the first and the second sets of electrodes 34, 44 is greatly reduced. Thus, the swatter in accordance with the present invention has greatly reduced the chance of electric shock to a user.

Figure 5:
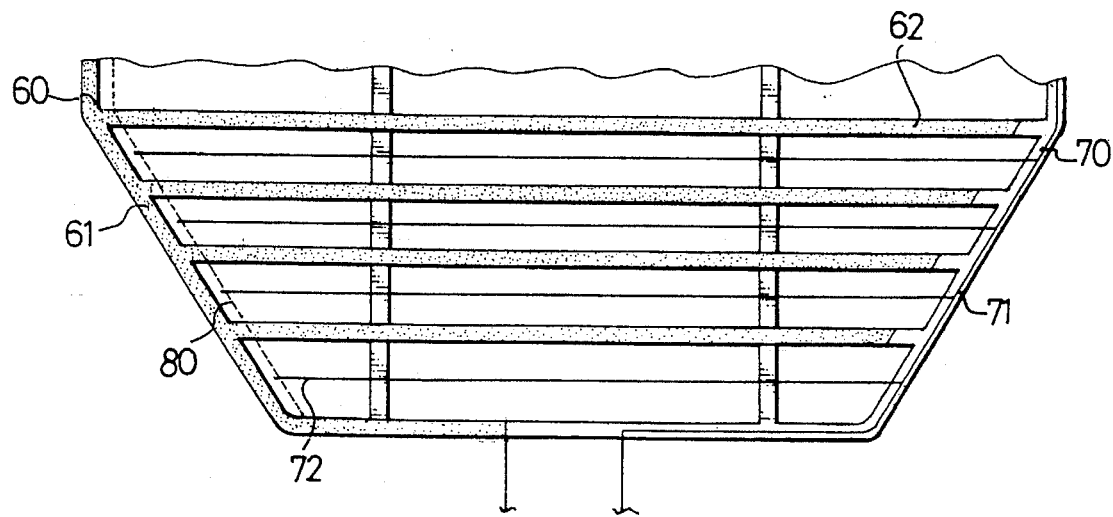
FIG. 5 is an elevational view partially showing another embodiment of the electrode arrangement in accordance with the present invention.

FIG. 5 shows another embodiment of an electrode arrangement of the present invention. A first set of electrodes 60 and a second set of electrodes 70 each have a spine portion 61, 71 and a plurality of finger electrodes 62, 72 extending from the spine portion interdigitate to each other.

The finger electrodes 62 of the first set of electrodes 60 are sandwiched by two insulation screens and have a width of no less than that of the horizontal bars of the insulation screens as taught in previous embodiment shown in FIGS. 1 and 4. The finger electrodes 72 of the second set of electrodes 70 are made of fine conductive wires as the longitudinal electrodes 48 of the second set of electrodes 44 previously mentioned. Tips of the finger electrodes 72 and the spine portion 61 of the first set of electrodes 60 are sandwiched by a peripheral edge 80 (shown in dashed line) of the insulation screens.

Referring to FIG. 1, the high voltage generating circuit 14, composed of a vibrator, a transformer, and a plurality of voltage doublers connected in a conventional configuration (not shown), is well known and is not described in more detail. An output of the high voltage generating circuit 14, providing a voltage of 1000 volts or more, is respectively connected to the first set and the second set of electrodes via a pair of wires 15, which pass through the tube 50. The switch 18 has an actuating button 19 on the handle 10 for controlling the ON/OFF of the switch 18.

While the present invention has been explained in relation to its preferred embodiment, is to be understood that various modifications thereof will be apparent to those skilled in the art upon reading this specification. Therefore, it is to be understood that this invention disclosed herein is intended to cover all such modifications as fall within the scope of the appended claims.

I claim:

1. An electronic insect-killing swatter comprising:

a handle;

a frame coupled to the handle and composed of a first insulation screen and a second insulation screen coincided with each other each having a periphery and a plurality of bars defining a plurality of grids for insects to marginally pass through;

a first set of electrodes having a peripheral electrode and a plurality of longitudinal electrodes sandwiched by the bars of the first and the second insulation screens and having a width no less than a width of the bars of the insulation screens;

a second set of electrodes having a peripheral electrode sandwiched by the peripheries of the first and the second insulation screens with an isolation strip to be electrically isolated from the peripheral electrode of the first set of electrodes and a plurality of longitudinal electrodes secured by the peripheries of the first and the second insulation screens in a staggered relation to the sandwiched longitudinal electrodes of the first set of electrodes; and a high voltage generating means provided within the handle having an output connected to the first set of electrode and the second set of electrode for generating a voltage sufficiently high to kill insects.

\* \* \* \* \*